(12) United States Patent
Ganapathiappan et al.

(10) Patent No.: US 7,888,428 B1
(45) Date of Patent: Feb. 15, 2011

(54) SURFACTANT INITIATOR AND LATEXES PREPARED USING SAME

(75) Inventors: Sivapackia Ganapathiappan, Palo Alto, CA (US); Zhang-Lin Zhou, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

(21) Appl. No.: 11/787,530

(22) Filed: Apr. 16, 2007

(51) Int. Cl.
*C08F 2/22* (2006.01)

(52) U.S. Cl. .................. 524/800; 524/801; 524/804

(58) Field of Classification Search ............ 524/800, 524/801, 804
See application file for complete search history.

(56) References Cited

U.S. PATENT DOCUMENTS

| | | | |
|---|---|---|---|
| 6,121,371 A * | 9/2000 | Matyjaszewski et al. .... | 524/804 |
| 6,995,206 B2 | 2/2006 | Zhou et al. | |
| 7,022,762 B2 | 4/2006 | Van Aert et al. | |
| 7,098,280 B2 | 8/2006 | Parker et al. | |
| 7,119,133 B2 | 10/2006 | Vincent et al. | |

\* cited by examiner

*Primary Examiner*—Bernard Lipman

(57) ABSTRACT

The present invention is drawn to a surfactant initiator. The surfactant initiator includes a first hydrophilic chemical group bonded to a first hydrophobic chemical group to form a first portion. A second portion is also included, made up of a second hydrophilic chemical group bonded to a second hydrophobic chemical group. A homolytic cleavable group chemically bonds the first and second portions. At least one of the first and second portions is configured to initiate free-radical polymerization upon separation of the homolytic cleavable group. Such surfactant initiators can be used to produce latex particulates and associated suspensions and inks.

17 Claims, No Drawings

SURFACTANT INITIATOR AND LATEXES PREPARED USING SAME

BACKGROUND OF THE INVENTION

Latex particles obtained by emulsion polymerization can have a variety of applications, including for use as model colloids for calibration of instruments used to measure particle size, for immobilization of biomolecules (such as proteins or peptides) on the surface of the particles, for development of new types of immunoassays, and for film formation for ink-jet printing, painting, and coating applications. While latex particulates have applications in these and other fields, the ink-jet ink imaging application can be used to favorably illustrate latex properties. Specifically, there has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film.

This being said, while latex particulates can improve durability of prints, they often exhibit undesirable qualities while in suspension. Water soluble polymers can increase the viscosity of a suspension because of dissolution. When the suspension is an ink, the viscosity can affect printability. Particularly, higher viscosity inks do not print properly in certain architecture. Further, if it is possible to print the ink, water soluble polymers in the printed ink can reduce the overall printed image durability. To overcome these drawbacks, water insoluble latex particulates can be added to a suspension. The addition of this type of latex particulates often only increase the viscosity of the suspension, e.g. ink, very slightly compared to the addition of water soluble polymers, and can therefore be more desirable for use. Regardless of the type of latex particles used, these latex particulates can have drawbacks. For example, they tend to settle out of and/or agglomerate in suspensions over time, and therefore, often are not stable in many storage conditions.

Latex particulates can be prepared through conventional emulsion polymerization processes. In this method, hydrophobic monomers are emulsified in water. Free-radical initiators have been used to initiate the polymerization. In some systems, the hydrophobic monomers are emulsified along with added surfactant, which can be adsorbed on the surface of the latex particulates. Unfortunately, this surfactant adsorption does not greatly increase particulate stability under many ink-jetting conditions that include the use of high-shear. This is particularly the case with thermal ink-jetting systems. An alternate approach is to include reactive surfactants in an attempt that they be included along with the monomers in the polymer chain. This approach can also be undesirable, as the surfactants do not get incorporated into the latex particulate fully because of the low reactivity of the surfactant compared to other monomers. Furthermore, incorporation of these surfactants occurs in a more random manner and not all particulates necessarily include appropriate amounts of the surfactant. Furthermore, the particle size of the latex particulate is affected because of the random substitution of surfactant along the chain length of the polymer.

This being the case, there is a continued need to provide improved latex particulates and methods of preparing the same.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof. It should also be noted that while the discussion may focus on surfactant initiators, a latex particulate, a latex suspension, an ink-jet ink, or a method of preparing the latex particulates, such discussion in one area is applicable to the other areas.

It is noted that, as used in this specification and the appended claims, the singular forms "a," "an," and "the" include plural referents unless the context clearly dictates otherwise.

As used herein, "vehicle," or "liquid vehicle" refers to the liquid fluid in which a colorant is placed to form an ink, a latex particulate is suspended to form a latex, or a colorant and latex particulate is placed or suspended to form a latex ink. Liquid vehicles are well known in the art, and a wide variety of liquid vehicles may be used in accordance with embodiments of the present invention. Such ink vehicles may include a mixture of a variety of different agents, including without limitation, solvents, co-solvents, buffers, biocides, viscosity modifiers, sequestering agents, stabilizing agents, and water. The liquid vehicle can also carry other additives such as other polymers, UV curable materials, and/or plasticizers, in some embodiments. It is noted that if a colorant, e.g., dye and/or pigment, is present in liquid vehicle, the solution or dispersion (with or without a latex is considered to be an ink). Whether or not a latex is present in the ink, a latex dispersion (without colorant) can be used as an overcoat for an ink as well.

The term "colorant" can include dyes, pigments, and/or other particulates that may be suspended or solvated in a liquid vehicle in accordance with embodiments of the present invention. Dyes are typically water soluble and pigments are typically not water soluble. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a milled or unmodified pigment that utilizes a dispersant (which can be a polymer or an oligomer or a surfactant) in the liquid vehicle to aid the pigment in remaining dispersed therein.

As used herein, "latex particulates" or "latex particles" refer to polymeric masses synthesized from individual monomers, which can be dispersed in a liquid vehicle forming a latex dispersion. This term can also include latex encapsulated pigments where a pigment is at least partially encapsulated with a latex polymer.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

With these definitions in mind, it has been recognized that it would be advantageous to develop a surfactant that can be controllably integrated into a latex particulate. The surfactant can be integrated or bonded to such a degree that the latex particulates exhibit good dispersion and stability qualities. Likewise, aqueous emulsions, latexes, latex particulates, and inks, which can provide improved dispersion and stability qualities, are taught herein. The method of forming such latex particulates can inherently create non-random inclusion of a surfactant integrally attached to the latex particulate at a first end of each polymer chain of a latex particulate.

As such, the present invention is drawn to a surfactant initiator and latexes that can be prepared therefrom. A surfactant initiator has the dual role of surfactant and initiator. As a single chemical compound acts to initiate polymerization of monomers, which then form the latex particulate, the surfactant initiator allows for incorporation into the latex particulate in a more controlled manner. Furthermore, the surfactant initiator is not included in the latex particulate in a random manner. Rather, the surfactant initiator, by its very nature of being an initiator, is included in the polymer chains primarily at an initial end position.

In accordance with this, various details are provided herein which are applicable to each of the surfactant initiator, latex particulate, emulsion composition, latex, ink-jet ink, etc., and methods for making the same. Thus, discussion of one specific embodiment is related to and provides support for discussion in the context of the other related embodiments.

In one aspect, a surfactant initiator can include two portions. Each portion can have a hydrophilic chemical group bonded to a hydrophobic chemical group. For ease of discussion, the two portions can be designated as first and second. Such designations should not be taken as restrictive or indicating any properties of one or the other unless specifically indicated, but rather is simply a designation for ease in description. Likewise, the components of the first or second portion can utilize the designation, e.g. first hydrophilic chemical group, first hydrophobic group, second hydrophobic group, second hydrophilic group. A homolytic cleavable group can chemically bond the two portions. The portions can be configured to initiate free-radical polymerization when the homolytic cleavable group becomes separated.

In one embodiment, one or more of the hydrophilic chemical groups can be located distally from the homolytic cleavable group. An example is shown as Formula 1.

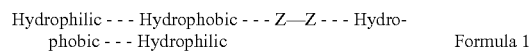
                        Formula 1

In the formula, Z—Z represents a homolytic cleavable group. As shown, the hydrophilic chemical group can be distally located from the homolytic cleavable group. The hydrophilic chemical group, when arranged in a position away from the body of a latex particulate, can improve dispersion and stability qualities for the latex particulate. As the homolytic cleavable group, when separated, begins free radical initiation, the distally located chemical group is also distally located on the polymer chain. When the distally located chemical group on the polymer chain is a hydrophilic chemical group, as taught herein, the resulting latex particulate has greater dispersion and stability.

The hydrophilic chemical groups of the surfactant initiator can be the same or different from one another, e.g. the first hydrophilic chemical group can be different from the second hydrophilic chemical group, or both hydrophilic chemical groups can be the same. Hydrophilic chemical groups can be anionic, cationic, or non-ionic. In one aspect, one or both hydrophilic chemical groups can be anionic. Non-limiting examples of anionic hydrophilic chemical groups include sulfonates, phosphates, and carboxylates. In another aspect, one or both hydrophilic chemical group can be cationic. Non-limiting examples of cationic hydrophilic chemical groups include ammonium and/or phosphonium ions. In still another aspect, suitable non-ionic hydrophilic groups include surfactants exhibiting ethoxy group hydrophilicity. Therefore, in one embodiment, at least one of the hydrophilic chemical groups includes an ethoxy group.

As with the hydrophilic chemical groups, the hydrophobic chemical groups can be the same or different from one another, e.g. the first hydrophobic chemical group can be different from the second hydrophobic chemical group, or both hydrophobic chemical groups can be the same. Hydrophobic chemical groups can be alkyl chains. In one embodiment, one or both hydrophobic chemical groups can comprise or consist essentially of an alkyl chain from about 5 to about 20 carbons.

The homolytic cleavable groups can include chemical groups with bonds subject to homolysis or homolytic fission. When separated or dissociated, the neutral molecule can generate two free radicals. As the homolytic cleavable group bonds the first and second portions of the surfactant initiator, each portion typically exposes an electron at the separation site of the homolytic cleavable group. When the homolytic cleavable groups undergo homolysis, they produce two equal parts on both sides of the group. For example, when the surfactant initiator of Formula 1 undergoes homolysis, it can produce chemicals of Formulas 2 and 3.

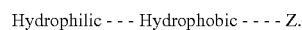
                        Formula 2

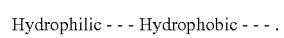
                        Formula 3

In one aspect, the homolytic cleavable group includes a peroxide compound, e.g. O—O. In another aspect, the homolytic cleavable group includes an azo compound, e.g. N=N. In the case of the peroxide, the compound will likely produce the chemical of Formula 2, wherein Z is an oxygen.

On the other hand, the azo compound can produce the chemical of Formula 3, where the homolysis causes the loss of N≡N.

The solubility of the surfactant initiator can be increased by including a solubility tuning group (STG) in the surfactant initiator structure. The STG can be any structure that can be chemically attached to the surfactant initiator, which improves organic-phase solubility of the surfactant initiator. Monomers used to produce latex particulates, e.g. vinyls and acrylics, can be hydrophobic in nature. If a STG is present in the surfactant initiator structure, then the surfactant initiator can be more compatible with the monomers. In one embodiment, the STG can include any n-alkyl, s-alkyl, or t-alkyl groups. A plurality of STGs can be included in the surfactant initiator structure. In one embodiment, both portions each include one STG. The STG(s) can be located in any position on the surfactant initiator, which allows for chemical attachment and allows the STG(s) to improve solubility of the surfactant initiator. In one embodiment, the STG can be interposed between the first hydrophobic group and the homolytic cleavable group, as shown by example in Formula 4.

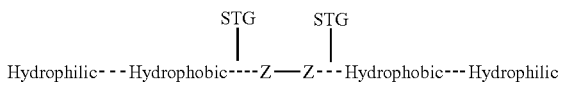

Formula 4

The surfactant initiators described herein can be used to form latex particulates. In one aspect, one or more surfactant initiator can be included in an aqueous emulsion. The aqueous emulsion can include a plurality of monomers dispersed therein. The homolytic cleavable group can be subjected to homolysis, thus separating the homolytic cleavable group and introducing free radicals. Polymerization can initiate and continue, with the first portion and the second portion of the surfactant initiators each acting as an initiator in the polymerization process. As the two portions of the surfactant initiators act as initiators, they are present in the polymer chains at initial ends of the individual polymer chains that make up a latex particulate.

Homolysis can be caused by exposing the homolytic cleavable group to energy in the form of UV radiation and/or heat. In one aspect, therefore, causing homolysis can include heating the homolytic cleavable group to a temperature greater than about 40° C. In another aspect, causing homolysis can include heating the homolytic cleavable group to a temperature greater than about 60° C. In another aspect, the step of causing homolysis can include exposing the homolytic cleavable group to UV radiation. The amount and type of UV radiation (e.g. near, far, extreme) required by a homolytic cleavable group to separate can be dependent on the homolytic cleavable group, as would be ascertainable by one skilled in the art after considering the present disclosure.

In one embodiment, one or a plurality of solid particles can be included in the emulsion during polymerization of the monomers and surfactant initiator. The solid particles can be at least partially encapsulated during polymerization. In one aspect, the solid particles can be substantially encapsulated by the latex particulates during polymerization. Pigments can be used as the solid particles in one embodiment. By encapsulating pigment particles during polymerization that include the surfactant initiator described herein, the pigment particles can demonstrate better stability and dispersion than without encapsulation.

The monomers used to form a latex particulate can be any monomer presently known in the art, and are often primarily hydrophobic in nature, though there can often be a mix of hydrophilic and hydrophobic monomers. In one embodiment, the monomer can comprise or consist essentially of an acrylate, a methacrylate, or other vinyl containing monomers such as styrene. Non-limiting examples of monomers include methyl acrylate, ethyl methacrylate, ethyl acrylate, butyl methacrylate, butyl acrylate, hexyl methacrylate, 2-ethylhexyl methacrylate, 2-ethylhexyl acrylate, isobutyl methacrylate, isobutyl acrylate, octyl methacrylate, lauryl methacrylate, dodecyl methacrylate, styrene, and mixtures thereof.

The latex, or dispersion of latex particulates, formed by this process includes a plurality of latex particulates dispersed in a liquid medium. The latex particulates typically comprise a plurality of polymer chains that are tangled or held together as small beads. From many to all of the individual polymer chains in each latex particulate can have a surfactant chemically attached to an initial end thereof. Such is a natural product of the surfactant having the dual-role of initiator and surfactant. Further, each polymer chain can be substantially free of surfactants not attached to the initial ends of the polymer chains. Additionally, because this process is so efficient in its use of surfactant in a controlled manner, often, no more than 10% of the surfactant in the latex is present in the liquid medium, as the majority of surfactant is attached to the latex particulates at initial ends of the individual polymer chains.

In one embodiment, greater than 50%, or even greater than about 75% or 90% of the plurality of polymer chains can have a surfactant chemically attached to an initial end. In another embodiment, no more than about 5%, or no more than about 2%, or even no more than about 1% of the surfactant in the latex is present in the liquid medium. Further, in one aspect less than about 0.5% of the surfactant in the latex is present in the liquid medium.

One specialized type of latex that can be prepared is a latex-containing ink. Another latex that can be prepared is an overcoating composition that is formulated to overprint and protect an ink-generated image. In either case, the ink or latex overcoat includes a liquid vehicle and the latex particulates, and in the case of an ink, a colorant. The liquid vehicle can include the liquid medium used to form the latex, and optionally, any other solvents or additives used to improve printability or other property of the ink or overcoating composition. For example, to the primarily aqueous medium used to form the latex can be added co-solvents, buffers, biocides, viscosity modifiers, sequestering agents, stabilizing agents, water, other polymers, UV curable materials, and/or plasticizers, as is generally known in the art.

The latex particulates can be present in the ink or overcoating formulation in an amount of about 1 wt % to about 50 wt %. In one specific embodiment, the latex particulates can be present at from about 2 wt % to about 20 wt %. In other embodiments, specifically with respect to inks, the colorant comprises or consists essentially of dye; or alternatively, the colorant comprises or consists essentially of pigment. Further, the pigment or other particle can be at least partially encapsulated by the polymeric particles. Such inks can also be formulated as ink-jet inks that can be printed from ink-jet architecture, and even from more demanding thermal ink-jet architecture.

Regarding the liquid vehicles and other additives that can be included in the formulations and methods of present invention, it is understood that the enumerated components are exemplary and do not limit the scope of vehicle components that can be used. For example, in some embodiments of the present invention, it may be favorable for the liquid vehicle to comprise water-soluble organic solvents or other co-solvents, and other additives as part of the liquid medium. The balance of any embodiment formulation can be purified water, or other vehicle component known in the art.

Classes of co-solvents that can be used separately or in combination include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologues of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and combinations thereof.

The liquid vehicle can also comprise solution characteristic modifiers such as viscosity modifiers, pH adjusters, preservatives, various types of surfactant, antioxidants, and evaporation accelerators. Examples of surfactants that can be included in limited amounts, according to the present invention, include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; and combinations thereof. Fluorosurfactants can also be used such as those previously known in the art.

pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid) and the like, may be included to eliminate the deleterious effects of heavy metal impurities.

Additionally, solids (either dissolved in the liquid vehicle or dispersed therein) can also be present in the formulations of the present invention, and can include binders, other latex particulates, UV curable materials, plasticizers, pigments (other than the colorant), etc.

Latex particulates produced using the surfactant initiators exhibit improved dispersibility and stability. The surfactant is incorporated fully in the latex particulate and is present at the end of the polymer chain. This type of incorporation improves the stability of the particle in a liquid medium, even under high shear conditions.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Surfactant Initiator

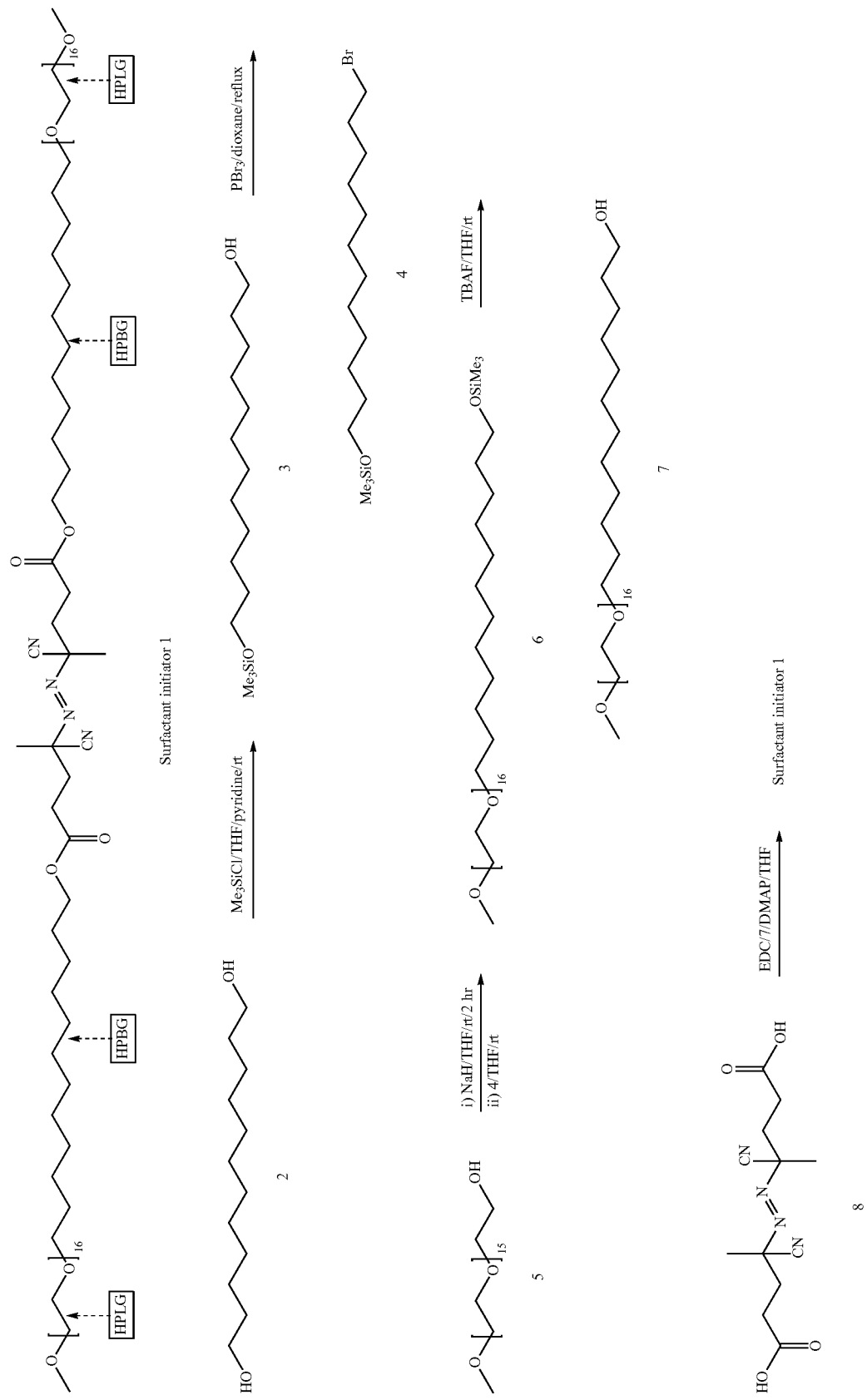

The surfactant initiator, shown as 1 above, is produced by first reacting 1,12-dodecanediol with one equivalent of trimethylsilyl chloride ($Me_3SiCl$) in pyridine and tetrahydrofuran (THF). The resulting product is a monoprotected alcohol, which is then brominated by $PBr_3$.

Mono-protected PEG 5 is treated with sodium hydride, and subsequently reacted with the brominated product above, indicated as 4, the reaction produces chemical 6. The product is treated with tetra-n-butylammonium fluoride (TBAF) to remove the trimethylsilyl group.

Finally, the product is reacted with an initiator acid, shown as chemical 8, in the presence of dicyclohexylcarbodiimide (DCC) to produce the desired surfactant initiator.

The surfactant initiator 1 is marked for ease to identify the hydrophobic and hydrophilic areas of the compound.

Example 2

Preparation of Latex Particulate Using Surfactant Initiator

Latex particulates are prepared through the polymerization of monomers. Specifically, 3 g of monomers styrene, hexyl methacrylate, 3-vinylbenzoic acid and ethylene glycol dimethacrylate, in the ratio of 20:71:8:1 along with 1.93 g of the surfactant initiator of Example 1 are dispersed in a liquid medium of water (15 ml). This emulsion is subjected to 70 C. Polymerization proceeds for approximately 5 h, thus producing a plurality of latex particulates.

Example 3

Preparation of Latex Particulate Using Surfactant Initiator in the Presence of Pigment Printex 25

An emulsion is formed using 3 g of monomers styrene, hexyl methacrylate, 3-vinylbenzoicacid and ethylene glycol dimethacrylate in the ratio of 20:71:8:1 along with 1.93 g of the surfactant initiator of Example 1 and 0.09 g hexadecanol are dispersed in a liquid medium of water (15 ml). This emulsion is mixed with pigment Printex 25 dispersed with the surfactant Lutensol AT 50 in water (121 g of 9.45% solids). Shear mixing is applied to coat the pigment with the monomers. This mixture is heated to 70° C. for 26 h and cooled. The mixture is neutralized with potassium hydroxide solution and filtered to obtain pigment-dispersed particles.

Example 4

Preparation of Latex Particulate Using Surfactant Initiator in the Presence of Pigment Printex 25

The process of Example 3 is repeated, with the exception that the Lutensol AT 50 is replaced by the initiator surfactant of Example 1.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A latex, comprising a plurality of latex particulates dispersed in a liquid vehicle, said latex particulates including a plurality of polymer chains having a surfactant chemically attached to an initial end of a plurality of the polymer chains, such that each polymer chain is substantially free of surfactant not attached to the initial ends, wherein no more than 10% of the surfactant is present in the liquid medium, and wherein greater than 75% of the plurality of polymer chains have a surfactant chemically attached to an initial end thereof.

2. A latex as in claim 1, wherein no more than 1% of the surfactant is present in the liquid medium.

3. An ink-jet ink, comprising the latex as in claim 1 and a colorant.

4. An ink-jet ink as in claim 3, wherein the colorant is pigment that is at least partially encapsulated by the latex particulates.

5. An ink-jet ink as in claim 3, wherein latex particulate does not encapsulate the colorant.

6. A latex comprising a plurality of latex particulates dispersed in a liquid vehicle, said latex particulates including a plurality of polymer chains having a surfactant chemically attached to an initial end of a plurality of the polymer chains, such that each polymer chain is substantially free of surfactant not attached to the initial ends, wherein no more than 10% of the surfactant is present in the liquid medium, and wherein the surfactant is generated from a surfactant initiator, comprising:
   a first hydrophilic chemical group bonded to a first hydrophobic chemical group to form a first portion;
   a second hydrophilic chemical group bonded to a second hydrophobic chemical group to form a second portion; and
   a homolytic cleavable group chemically bonding the first portion to the second portion,
   wherein when the surfactant initiator initiates free-radical polymerization and the homolytic cleavable group becomes separated, at least one of the first and the second portions form the surfactant that is chemically attached to an initial end of a plurality of the polymer chains.

7. A latex as in claim 6, wherein the first and the second hydrophilic chemical groups of the surfactant initiator are distally located from the homolytic cleavable group compared to the first and the second hydrophobic groups.

8. A latex as in claim 6, wherein at least one of first or the second hydrophilic chemical group of the surfactant initiator is anionic and is selected from the group consisting of sulfonates, phosphates, and carboxylates.

9. A latex as in claim 6, wherein at least one of the first or the second hydrophilic chemical group of the surfactant initiator is cationic and includes ammonium ions or phosphonium ions.

10. A latex as in claim 6, wherein at least one of the first or the second hydrophilic chemical group of the surfactant initiator includes an ethoxy group.

11. A latex as in claim 6, wherein at least one of the first or the second hydrophobic chemical group is alkyl.

12. A latex as in claim 6, wherein the homolytic cleavable group of the surfactant initiator includes a peroxide group.

13. A latex as in claim 6, wherein the hemolytic cleavable group of the surfactant initiator includes an azo group.

14. A latex as in claim 6, wherein the surfactant initiator further comprises a solubility tuning group selected from n-alkyl, s-alkyl, or t-alkyl attached to at least one of the first portion or the second portion.

15. A latex as in claim 14, wherein the solubility tuning group is chemically attached at a position interposed between the first hydrophobic group and the homolytic cleavable group.

16. A latex as in claim 14, comprising two solubility tuning group, wherein one solubility tuning group is chemically attached to the first portion and the other solubility tuning group is chemically attached to the second portion.

17. A latex as in claim 6, wherein the first portion and the second portion of the surfactant initiator are the same.

* * * * *